Figure 1:
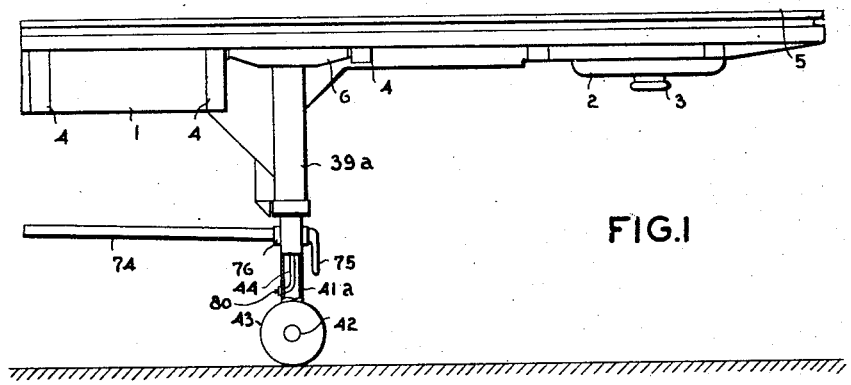

Oct. 23, 1951     H. J. VAN DOORNE     2,572,409
SUPPORTING MECHANISM FOR SEMITRAILERS

Filed May 24, 1948     4 Sheets-Sheet 1

Inventor:
HUBERTUS JOSEPHUS VAN DOORNE
By: Hugh A. Kirk
His Attorney

Oct. 23, 1951 H. J. VAN DOORNE 2,572,409
SUPPORTING MECHANISM FOR SEMITRAILERS
Filed May 24, 1948 4 Sheets-Sheet 2

Inventor:
HUBERTUS JOSEPHUS VAN DOORNE
By: Hugh Atkin
His Attorney

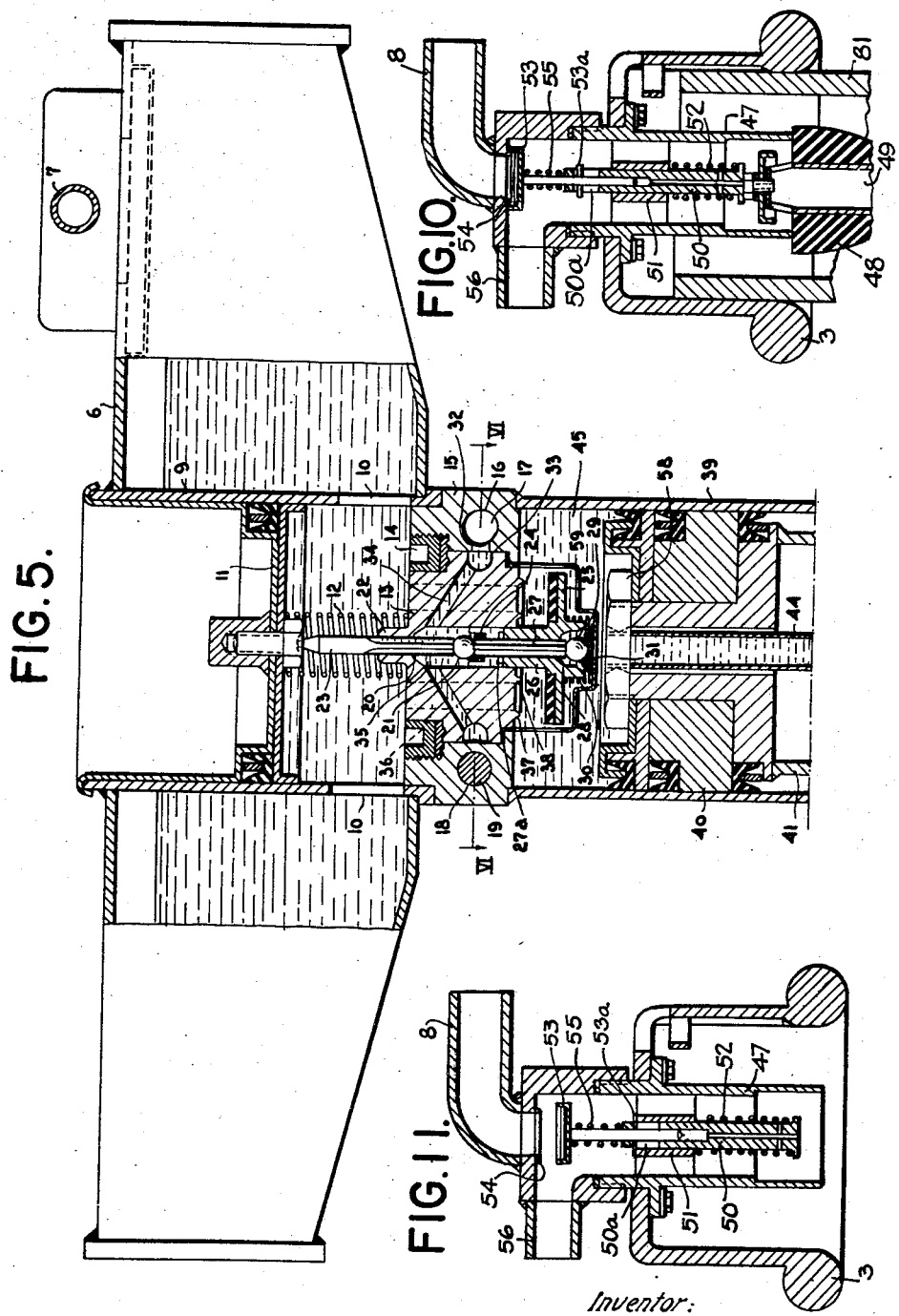

Oct. 23, 1951 H. J. VAN DOORNE 2,572,409
SUPPORTING MECHANISM FOR SEMITRAILERS
Filed May 24, 1948 4 Sheets-Sheet 4

*Inventor:*
HUBERTUS JOSEPHUS VAN DOORNE
By: *Hugh A. Kirk*
*His Attorney*

Patented Oct. 23, 1951

2,572,409

UNITED STATES PATENT OFFICE 2,572,409

SUPPORTING MECHANISM FOR SEMITRAILERS

Hubertus Josephus van Doorne, Deurne, Netherlands

Application May 24, 1948, Serial No. 28,947
In the Netherlands May 28, 1947

14 Claims. (Cl. 280—33.05)

This invention relates to a fluid operated jack or support. More particularly it deals with the control mechanism for such a support, such as for example, the control and operation of a retractable support for the front end of a semi-trailer by the driver of the tractor for said semi-trailer without the driver leaving his seat in the tractor.

Previously in such semi-trailers it has been necessary for the driver to spend time and energy in leaving his seat in the tractor and manually extending or lowering the supporting legs for the front end of a semi-trailer before releasing the connection between the tractor and the semi-trailer, although a mechanism was provided whereby these supporting legs could be retracted without the driver leaving his cab after the trailer had been connected to the fluid pressure system of the tractor.

It is an object of this invention to produce a new, safe, simple, fool-proof, effective, and efficient control mechanism for a retractable fluid operated jack or support.

Another object is to provide a support for the front end of a semi-trailer, which may be both extended and retracted automatically without the driver of the tractor of the semi-trailer leaving his seat in the tractor.

In accordance with this invention, there is provided means to retract automatically a supporting member once its control connection has been made and put into operation, and means to extend automatically said supporting member as soon as the control connection has been released from operation, removed or severed. This may be accomplished by providing two fluid pressure systems one of which controls the other which operates the supporting member. For example, in the case of the front retractable support for a semi-trailer, the first fluid system may comprise a differential pressure fluid system controlled by a tractor to operate a valve to control the flow of the fluid, preferably a liquid, in the second fluid system. This liquid flows into and out of a fluid motor means such as a cylinder or cylinders to operate a piston or pistons to extend and retract said support. As long as the tractor is connected to the semi-trailer or the first fluid system is operatively connected to the supporting mechanism, said valve is operated to maintain the support in its retracted position. But, the absence of a pressure or vacuum in the first fluid system, which occurs when the tractor control connection is opened or removed from the semi-trailer, permits the liquid in the second fluid system to fill the cylinder, the piston in which may be extended by the pull of gravity on its own weight. Then when the tractor itself is removed, an automatic valve mechanism may prevent the incompressible fluid of the second fluid system now in the cylinder from flowing out of the cylinder and thereby maintaining the support in its extended and supporting position. If desired, additional means may be provided for manually pumping the liquid of the second fluid system into or out of one or more of the supporting cylinders to tilt, raise, or lower the front end of the semi-trailer, after the pressure or vacuum from the first fluid system has been removed, or the tractor has been detached from its semi-trailer.

Figure 2:
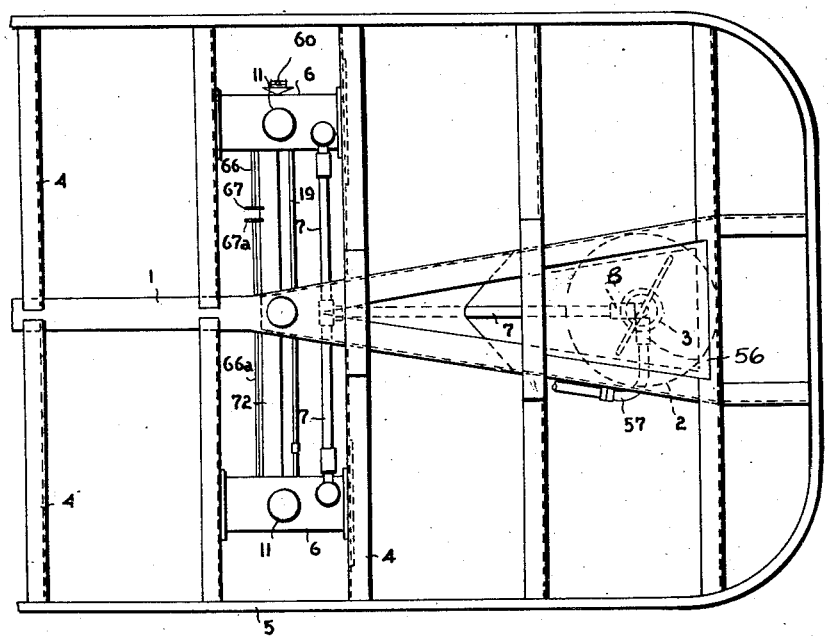
Figure 4:
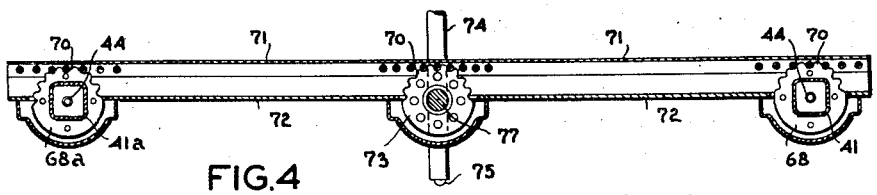
Figure 3:
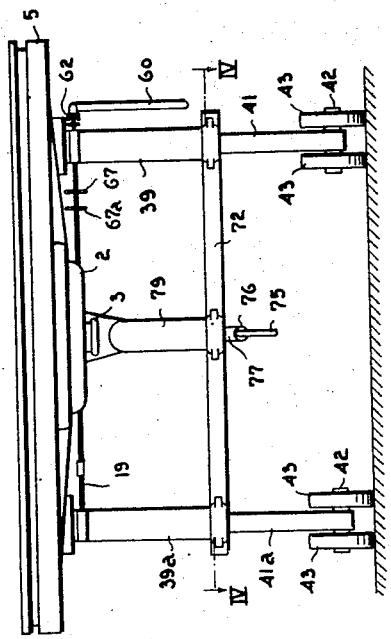
Figure 6:
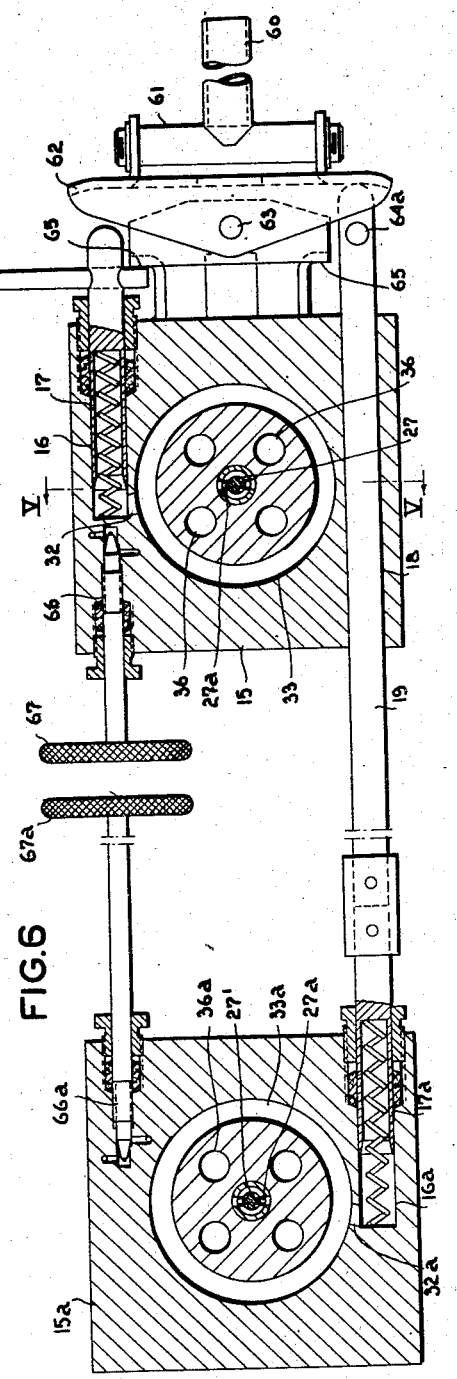

The above mentioned and other features and objects of this invention and the manner of attaining them will become more apparent and the invention itself will be best understood by reference to the following description of a specific embodiment of the invention taken in conjunction with the accompanying drawings, wherein:

Fig. 1 is a side elevation of the front part of a semi-trailer disclosing one embodiment of this invention, Fig. 2 is a top plan view of the front part of the trailer shown in Fig. 1 with the floor of the trailer removed, Fig. 3 is a front end view of the trailer shown in Fig. 1, Fig. 4 is a vertical section of the steering apparatus for the support taken downward from the line IV—IV shown in Fig. 3, Fig. 5 is a vertical sectional view of the reservoir and valve mechanism for operating the right-hand supporting leg shown in Fig. 3, Fig. 6 is a sectional view taken along line VI—VI of Fig. 5 of both of the supporting leg mechanisms shown in Fig. 3, Figs. 7, 8 and 9 are sectional views of the valve mechanism shown in Fig. 5 in three other and different operating positions, Fig. 10 is a vertical sectional view of the coupling between the semi-trailer and tractor when the tractor is connected to the semi-trailer, and Fig. 11 is a vertical sectional view of the coupling on the semi-trailer when the tractor coupling is removed.

Referring to Figs. 1, 2 and 3, the main frame on the semi-trailer comprises a central hollow beam 1 which is flared and flattened as it extends toward its front end to form a mounting for a bearing plate of fifth wheel 2 on which the semi-trailer rests when it is connected to a tractor (a portion of which is shown at 81 in Fig. 10). In the center of plate 2 there extends downwardly a coupling sleeve 3 which is engaged by a hollow coupling pin or sleeve 81 of a tractor in a manner similar to that described in my Netherlands Patent No. 40,766 or my British Patent No. 464,077. The floor of the trailer is supported by cross beams 4 and surrounded by a rim 5. Between two adjacent beams 4 there are mounted two liquid reservoirs or tanks 6, one on each side of the trailer. These tanks 6 are connected at their ends to the beams 4 and spaced below the floor of the trailer to provide sufficient room for the operation of the piston 11 in the top of each tank, and for pipe connections 7 from the top of each tank to the center of the coupling sleeve 3 where the pipe 7 is connected to an elbow 8, shown in Figs. 10 and 11. These tanks 6 and their mountings are made sufficiently rigid to support the weight of a loaded semi-trailer through the cylinders 39 and 39a and legs 41 and 41a (Figs. 1 and 3).

Centrally of each of the liquid tanks 6, as shown in Fig. 5 there is a vertical cylinder 9 having a piston 11 closing the upper end of said cylinder, and a valve block 15, or 15a, closing its lower end. Between the pistons 11 and the valve blocks 15 and 15a the cylinder communicates with its corresponding tank through openings 10. Each piston 11 is normally urged upwardly away from the block 15 or 15a by a spring 12 resting against the valve housing 13, held in position in the block 15 by means of an annular nut 14.

The operation of each multi-valve mechanism mounted in the valve housings 13, permits liquid from its corresponding tank 6 to flow to and from its corresponding chamber 45 in cylinder 39 or 39a mounted vertically below block 15 or 15a. This liquid fills the chamber 45 when the piston 40 in the chamber 45 descends by gravity, due to the weight of the legs 41 carrying axles 42 and wheels 43, when the supporting mechanism is to be put into operation to support the front end of the semi-trailer as shown in Figs. 1 and 3. The operation of this supporting mechanism is controlled by the increase or decrease in fluid pressure in pipe 7 connected to the tractor, so that when the pressure above the liquid in the tank 6 is below that on the lower face of the piston 40, the legs 41 and 41a will be pushed or sucked up into the cylinders 39 and 39a, respectively, to retract the supporting wheels 43, and simultaneously to push the liquid from chambers 45 into the tanks 6. The detailed operation of the multi-valve mechanism mounted in block 15 or 15a and that of the control connection in coupling sleeve 3 are described below, for the specific case where the control therefor is operated by vacuum from the engine of the tractor, which vacuum system may also be employed for the control of the brakes on the trailer.

Referring now to Fig. 10 there is shown a slidable coupling sleeve 81 mounted on the tractor in its engaging position with the sleeve 3 on the semi-trailer, as fully described in my above mentioned British patent. Inside the sleeve 3 there is mounted a sleeve 47 which communicates with pipe elbows 56 and 8, and inside of which sleeve 47 is mounted in guide 51 a slidable rod 50 which slidably supports valve stem of valve 53. For the purpose of illustration, the two elbows 8 and 56 in Figs. 10 and 11 are shown 180° apart, when actually they are 90° apart as shown in Fig. 2. This valve 53 operates to close the opening to elbow 8 communicating with tubes 7 and tanks 6 when the duct 49 on the trailer is forced upwardly with sleeve 81 and makes a tight connection by means of the thick rubber washer 48 with the lower end of sleeve 47. This valve 53 is urged by a weak spring 55 into this closed position, however, as soon as a vacuum is applied from the tractor through duct 49, the valve 53 will open to produce a vacuum in pipes 7 and above the liquid in tanks 6. This condition remains as long as the tractor is operatively coupled to the semi-trailer, so that the supporting legs of the semi-trailer will remain in their retracted position. However, operation of the brakes in a normal vacuum brake system is accomplished by releasing the vacuum in the control pipes 49 and 57 so that the normally spring operated brakes may be applied. This release of vacuum or increase in pressure in line 49 from that normally maintained therein will not be transmitted to the tanks 6 to lower the supporting mechanism because of the valve 53 which closes under the action of spring 55 as soon as the pressure in sleeve 47 is more than that in pipe 7, thereby preventing release of the vacuum in tanks 6 which maintains the supporting mechanism in its retracted position.

When the tractor is disconnected from the semi-trailer as shown in Fig. 11, the end of the tube 49 which raises the rod 50 to place valve 53 into its operative position, is removed so that a compression helical spring 52 pulls the rod down so far that the cross-pin 53a mounted on the valve stem of valve 53 engages the top end of slot 50a and pulls valve 53 away from any possible contact with its seat at the end of elbow 8. This permits atmospheric pressure to enter the pipes 7 and the space above the liquid in tanks 6 so that the weight of the legs 41 and 41a with their wheels 43 will cause the supporting mechanism to extend downwardly to the ground and suck liquid from the tanks 6 into the chambers 45. This operation also acts as a safety supporting device for the front end of the semi-trailer in case of a break or leak in this vacuum system, in that as soon as the vacuum above the liquid in tanks 6 is removed or broken the support for the trailer is automatically lowered and remains in its trailer supporting position until a vacuum is again applied to the top of tanks 6.

The retraction or the raising of the front support for the semi-trailer is accomplished as soon as the tractor is connected to the trailer and a vacuum is produced in pipes 7 and the top of the tanks 6. The reduction of pressure within the tanks 6 causes the atmospheric pressure to push on the top of the large surface area of piston 11 pushing this piston down into the position shown in Fig. 5, compressing the spring 12 and contacting the end of suction valve stem 23, the lower portion of which has a cross-shaped cross-section. This stem 23 then pushes the ball 21 of this valve from its seat 20 against the normally closing action of spring 24 and into contact with the stem 27 of the smaller pressure ball-shaped valve 29. This stem 27 is of cross-shaped cross-section throughout its entire length thereby providing longitudinal channels. Continued downward motion of the stem 27 pushes the ball 29 from its seat 28 against the normally closing action of spring 31, so as to break the pressure of the liquid in the chamber 45 and to permit this liquid to pass along the channels in the side of stem 27, around ball 21, along the channels in the side of stem 23, and into the chamber of cylinder 9 communicating with tanks 6. Then, as the valve stem 23 pushes, via the ball 21, the valve stem 27 further downwardly, the cross pin or lateral projections 27a on said stem 27, mounted in a slot of the stem 26 of a second and larger pressure valve 25 abut against the bottom of this slot, thus removing the larger pressure valve 25 from its ring seats 37 and 38 against the action of spring 30, said valve 25 opening the four large ducts 36 in housing 13

(see Fig. 6) between chamber 45 and tanks 6. This permits the liquid in chamber 45 to flow or be sucked up more rapidly into the appertaining tank 6, thereby increasing the speed of retraction of the corresponding supporting leg 41 or 41a. Since the lower side of the piston 40 communicates with the atmosphere, atmospheric pressure also aids in pushing the piston 40 into the position shown in Fig. 5 against the vacuum present in corresponding tank 6. The upward movement or retraction of the legs 41 and 41a may be limited by the contact of the wheels 43 with the housing 72 shown in Fig. 3.

Figure 9:
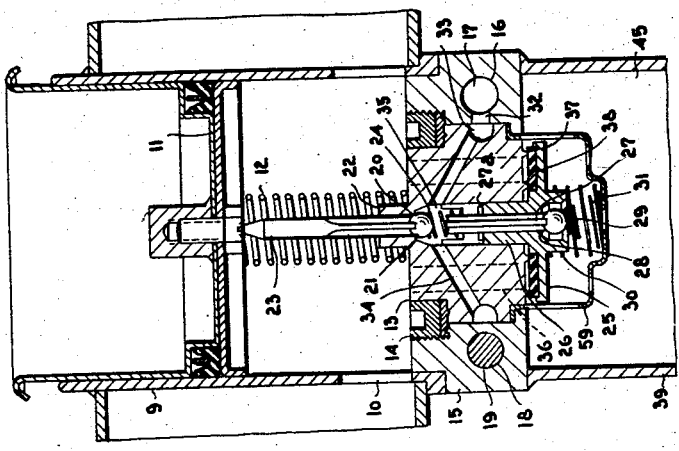
Figure 8:
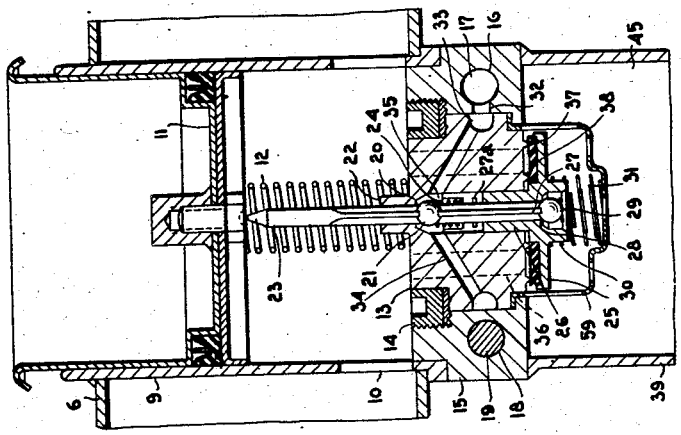
Figure 7:
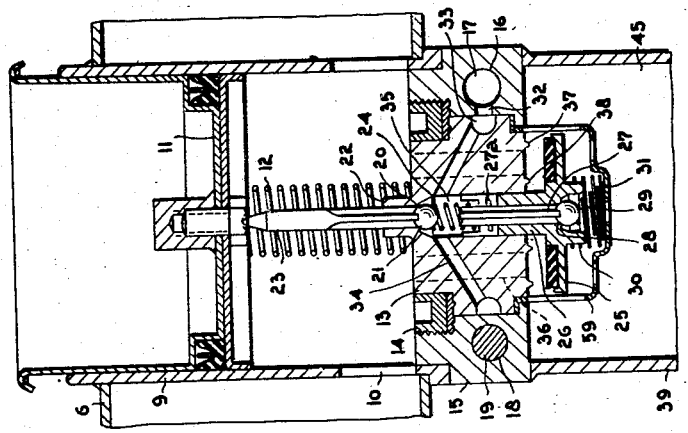

In the case where the tractor is disconnected from the semi-trailer, the valves mounted in block 15 take the positions shown in Figs. 7, 8, and 9, viz: when the legs are being extended by their weight, when the legs are supporting the semi-trailer, and when it is desired to raise manually the front end of the trailer, respectively. Referring first to Fig. 7, as soon as the vacuum in the tanks 6 is broken or released by operation of a valve in the tractor (not shown), or by removal of the sleeve 81 from the sleeve 3 as shown in Fig. 11 (which is done by the driver in the cab of the tractor as described in the above mentioned British patent), the spring 12 in cylinder 9 pushes the piston 11 upwardly as shown in Fig. 7. Correspondingly the spring 24 acting against the ball suction valve 21 pushes up the pin 23 and valve 21 into its seat 20. The spring 24, however, also acts against the valve stem 26 of the large pressure valve 25 and against the action of springs 30 and 31 supported by bracket 59 mounted in block 15, so that with the weight of the leg 41 or 41a sufficient suction is applied to the valve 25 to cause it to open as shown in Fig. 7 and allow the liquid from tanks 6 to flow through ducts 36 to fill the chamber 45 between the descending piston 40 and block 15.

As soon as the wheels 43 on legs 41 and 41a reach the ground as shown in Figs. 1 and 3, no more suction is applied by their weight against the valve 25, so that springs 30 and 31 close the pressure valves 25 and 29 as shown in Fig. 8. Now the tractor may be removed from under the fifth wheel 2 of the trailer and the weight of the front end of the trailer will be supported by the legs 41 and 41a pressing against the incompressible fluid or liquid, such as oil, in chamber 45 which cannot escape through the now closed valves 25 and 29.

In order to prevent the tractor from being driven away before the front part of the trailer rests on the supporting legs 41 and 41a, a safety device may be provided to indicate to the driver of the tractor the oil level in tanks 6 which also may automatically release a pawl (not shown) allowing the sleeve 81 only to be removed sufficiently to open the valve 53 and not release the coupling to the sleeve 3 on the semi-trailer until the wheels 43 have reached the ground.

There may be provided additional means whereby either one or both of the legs 41 and 41a may be further extended or retracted when in the position shown in Figs. 1 and 3 in order to raise or lower the front end of the trailer or tilt it when the tractor is disconnected from the trailer. To raise the trailer, the blocks 15 and 15a are provided with small pumps located in small horizontal holes 16 and 16a containing pistons 17 and 17a, respectively (see Fig. 6). These pistons are preferably extended out to the same side of the trailer to contact a manual pump rocking lever 62 vertically pivoted at 63 and having a horizontally pivoted handle 60 on axle 61 on the lever 62. Normally this handle 60 hangs vertically downwardly along one side of the cylinder 39 as shown in Fig. 3. However, when it is raised into a horizontal position and pushed back and forth around pivot 63, it alternately pushes the pistons 17 and 17a, through extension 19 passing through hole 18 in block 15, which pistons are maintained in contact with the lever 62 by means of the springs shown between them and the bottoms of their respective cylinder holes 16 and 16a. These holes 16 and 16a communicate with annular grooves 33 and 33a in housing members 13 through ducts 32 and 32a in blocks 15. The annular grooves 33 and 33a communicate with chamber 35 through ducts 34, which chamber communicates with the suction valve 21 and the smaller pressure valve 29. Thus, on the suction stroke of the piston 17 or 17a the valve 21 is opened against the action of the spring 24 as shown in Fig. 8. Then on the compression stroke of the piston 17 or 17a, the suction valve 21 is closed and the smaller pressure valve 29 is opened as shown in Fig. 9 to force the liquid into the chamber 45 for raising the trailer.

If it is desired to tilt the trailer, only one of the pistons 17 and 17a may be operated, by turning the corresponding cross-bar 64 or 64a adjacent the pump handle end of the pistons into the position shown for piston 17 in Fig. 6, and locking it under the edge 65 of the support for the pivot 63. This compresses the spring in the respective locked piston and keeps it out of engagement with the lever 62, so that only the other piston will be operated by pumping the handle 60.

If it is desired to lower either or both sides of the trailer by permitting either or both of the legs 41 and 41a to be retracted under the weight of the front end of the semi-trailer, either or both of the needle valves 67 and 67a, threaded at 66 and 66a into the blocks 15 and 15a, respectively, may be opened to permit the liquid to leak from the chambers 45 into the tanks 6 through the small ducts adjacent the ends of the needle valves. The valve handles 67 and 67a are preferably both located on the same side of the semi-trailer as shown in Fig. 2 so that the operator may control both supporting legs without changing his position. It is also desirable that the pump handle 60 be located on the same side of the trailer.

In order to reduce the weight of the legs 41 and 41a they may be made hollow and empty instead of filled with liquid, and a special duct 44 may be provided from the center of the pistons 40 to the side of the legs 41 and 41a as shown in Fig. 1 so that the liquid in the tanks 6 and chambers 45 may be replaced, added to, or removed when necessary by unscrewing cap 80.

In the specific embodiment shown the lower legs 41 and 41a are square in cross-section as shown in Fig. 4, and slide through partially toothed gears 68 and 68a having teeth 70 for engagement with a slidable rack 71 mounted in a housing 72 fixed to the lower end of the cylinders 39 and 39a. In the center between cylinders 39 and 39a there is shown an auxiliary cylinder 79 to the bottom of which is journaled a gear 73, similar to gears 68 and 68a, fixed to the shaft 77 having a sleeve 76 through which a long pulling and steering bar 74 may be inserted having a handle 75 for maneuvering the semi-trailer and steering the two legs 41 and 41a in unison when the tractor is disconnected from the trailer. This steering mechanism is specifically disclosed in my co-pending application Serial No. 28,948 filed May 24, 1948.

Although the above embodiment has been described in connection with a vacuum system for a semi-trailer, the same principal and apparatus may be employed for a fluid pressure system wherein the pressure is applied to the opposite side of the piston 40 by means of a conduit not shown. In such a case that portion of the legs 41 and 41a between the piston heads 40 and the cylinders 39 and 39a adjacent the housing 72, would have to be packed to contain the pressure applied thereto to raise the legs 41 and 41a. In such systems the tanks 6 would be open to the atmosphere and pipe 7 would be connected to the lower end of each cylinder 39 and 39a as well as to the top of piston 11, but the same type of control valve mechanism could be used between the tanks 6 and the chambers 45.

This invention may also be adapted for semi-trailers having only one retractable supporting leg mounted in the cylinder 79 shown in Fig. 3 and/or for semi-trailer frames having two parallel side beams instead of one central beam as in the trailer disclosed.

While there is described above the principles of this invention in connection with specific apparatus, it is to be clearly understood that this description is made only by way of example and not as a limitation to the scope of this invention.

What is claimed is:

1. A supporting mechanism comprising: an extendable and retractable support, a gaseous pressure system including a differential pressure responsive device to control the extension and retraction of said support, and a liquid pressure system including a one-way valve to maintain said support in its extended and supporting position, said differential responsive device controlling the operation of said one-way valve to control the flow of said liquid in said liquid pressure system.

2. The mechanism of claim 1 wherein said gaseous system is a vacuum system.

3. A fluid pressure extendable and retractable jack mechanism comprising: a motor including a cylinder, a piston operating in said cylinder, a liquid reservoir, a duct connection between said motor and said reservoir including a multi-valve control mechanism, a first fluid pressure system to operate said multi-valve, and a second fluid pressure system controlled by said valve to extend and retract said piston.

4. The mechanism of claim 3 wherein said multi-valve comprises a suction operated valve and a pressure operated valve and means for opening both of said valves at the same time.

5. The mechanism of claim 3 wherein said valve mechanism includes a second cylinder, and a second piston operating in said second cylinder in response to said first fluid pressure system.

6. In a tractor and semi-trailer having a fluid differential pressure brake control system with coupling means to connect and disconnect said system between said tractor and said semi-trailer, said trailer being provided with a front end having a retractable support, the improvement comprising: a first fluid pressure system connected with the fluid of said brake control system of said trailer to control the extension and retraction of said support, a second fluid pressure system including a coacting device to maintain said support in its extended and supporting position, and means to control said first fluid pressure system including an interconnection responsive device between the coupling means of the semi-trailer and said tractor.

7. The semi-trailer of claim 6 wherein said first fluid pressure system includes cut-off valve means to prevent the operation of said support by variations of pressure in said brake control system to operate the brake.

8. The semi-trailer of claim 6 wherein said first fluid pressure system includes a pressure responsive device and a valve in said second fluid pressure system operated by said pressure responsive device to operate said support.

9. The semi-trailer of claim 6 wherein said second fluid pressure system includes a one-way valve operated by the fluid in said second fluid pressure system to maintain said support in position.

10. The semi-trailer of claim 6 including separate manually operable fluid motor means in said second fluid pressure system to change said supporting position.

11. The semi-trailer of claim 10 wherein said separate fluid motor means includes a fluid pump and duct interconnection.

12. In a tractor and semi-trailer having a retractable front support for said semi-trailer, said front support comprising two vertical cylinders, one on each side of said trailer, and having extendable and retractable wheel supporting legs slidable in said cylinders, the improvement comprising: a piston connected to each leg in said cylinders, a separate liquid reservoir communicating with each said cylinder above said piston, multi-valve mechanism between each reservoir and its corresponding cylinder, a fluid differential pressure system to control the operation of said valves, a liquid in each of said reservoirs, said system including means interacting to control flow into and out of said cylinders in conjunction with said valves to extend, maintain, or retract said legs in said cylinders.

13. The semi-trailer of claim 12 wherein said multi-valve mechanism includes passages having therein a suction valve, a smaller pressure valve, a larger pressure valve, and a device responsive to a change in pressure in said fluid differential pressure system to open all of said valves to retract said legs.

14. The semi-trailer of claim 12 wherein said multi-valve mechanism has passageway therefrom adapted as opened by the valves to extend said legs and as closed to maintain said legs in position.

HUBERTUS JOSEPHUS v. DOORNE.

REFERENCES CITED

The following references are of record in the file of this patent:

UNITED STATES PATENTS

| Number | Name | Date |
| --- | --- | --- |
| 1,739,496 | Bartholomew | Dec. 17, 1929 |
| 1,853,576 | Rogers | Apr. 12, 1932 |
| 2,015,100 | Cederstrom | Sept. 24, 1935 |
| 2,142,216 | Seyferth | Jan. 3, 1939 |
| 2,232,754 | Winn | Feb. 25, 1941 |
| 2,355,775 | Barnhardt | Aug. 15, 1944 |